(No Model.) 2 Sheets—Sheet 1.

J. B. WARING & H. R. CASSEL.
CENTRIFUGAL FILTER.

No. 568,821. Patented Oct. 6, 1896.

Witnesses:
John Becker
Fred. Seidel

Inventors.
John B. Waring
Henry R. Cassel
by their attorneys
Roeder & Briesen (No Model.) 2 Sheets—Sheet 2.

J. B. WARING & H. R. CASSEL.
CENTRIFUGAL FILTER.

No. 568,821. Patented Oct. 6, 1896.

Witnesses:
John Becker
Frederick Seibel

Inventors:
John B. Waring &
Henry R. Cassel
by their attorneys
Roeder & Briesen

UNITED STATES PATENT OFFICE.

JOHN B. WARING, OF NEWARK, NEW JERSEY, AND HENRY R. CASSEL, OF NEW YORK, N. Y.

CENTRIFUGAL FILTER.

SPECIFICATION forming part of Letters Patent No. 568,821, dated October 6, 1896.

Application filed November 25, 1895. Serial No. 569,978. (No model.)

*To all whom it may concern:*

Be it known that we, JOHN B. WARING, of Newark, Essex county, New Jersey, and HENRY R. CASSEL, of New York city, New York, have invented an Improved Centrifugal Filter, of which the following is a specification.

This invention relates to a centrifugal filter which is so constructed that the filtrate is quickly and completely separated from the solid residue by a continuous process. The filter is particularly adapted for effecting the extraction of metals in solution from their ores by lixiviation processes, but it may be employed in other arts where a rapid and thorough filtering operation is desired.

Figure 1:
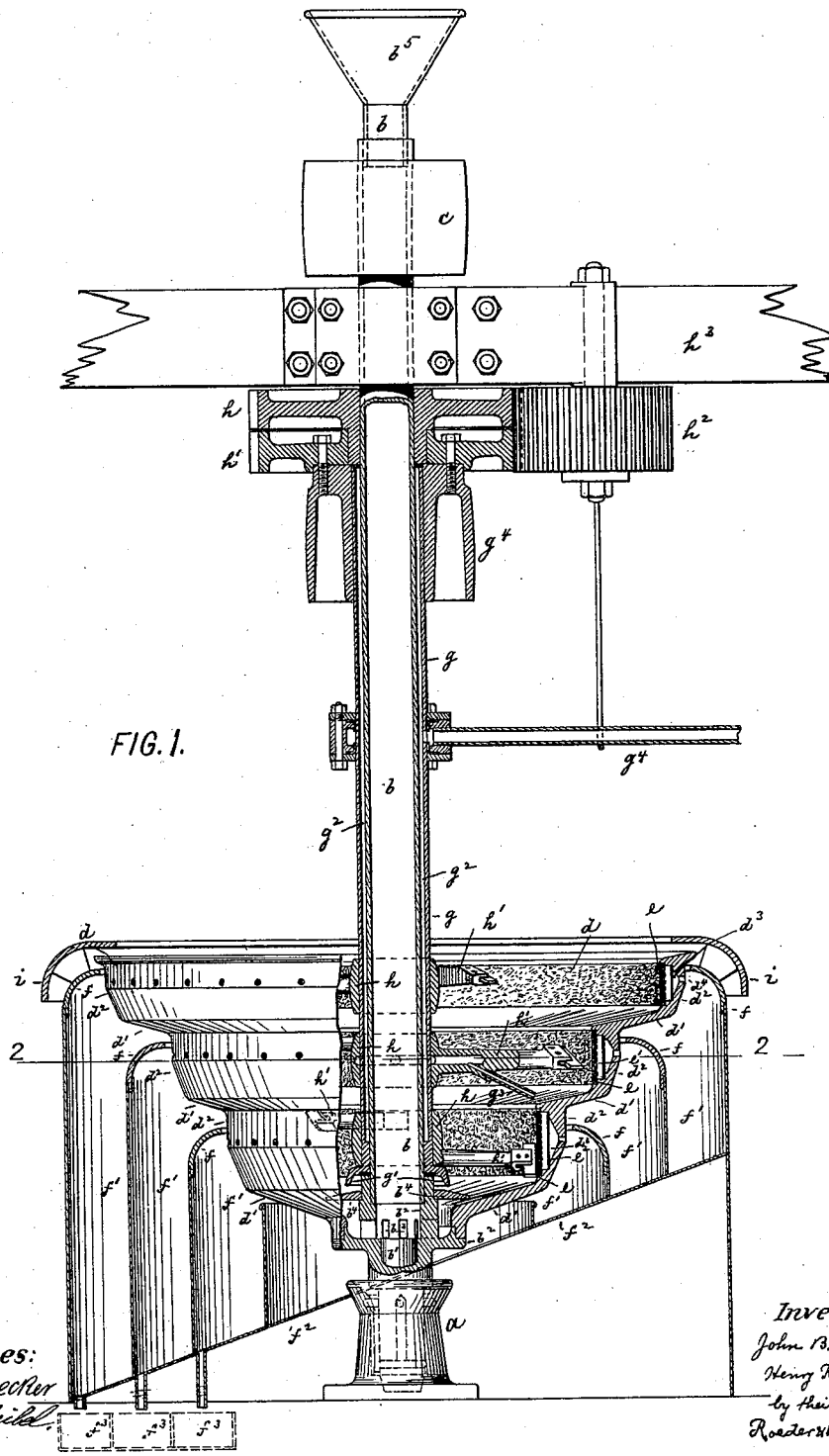
Figure 5:
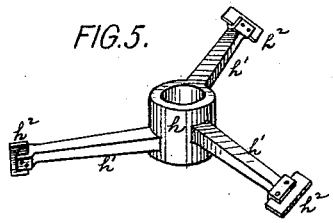
Figure 4:
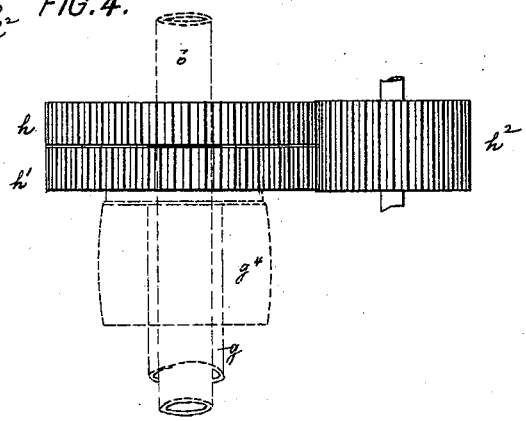
Figure 2:
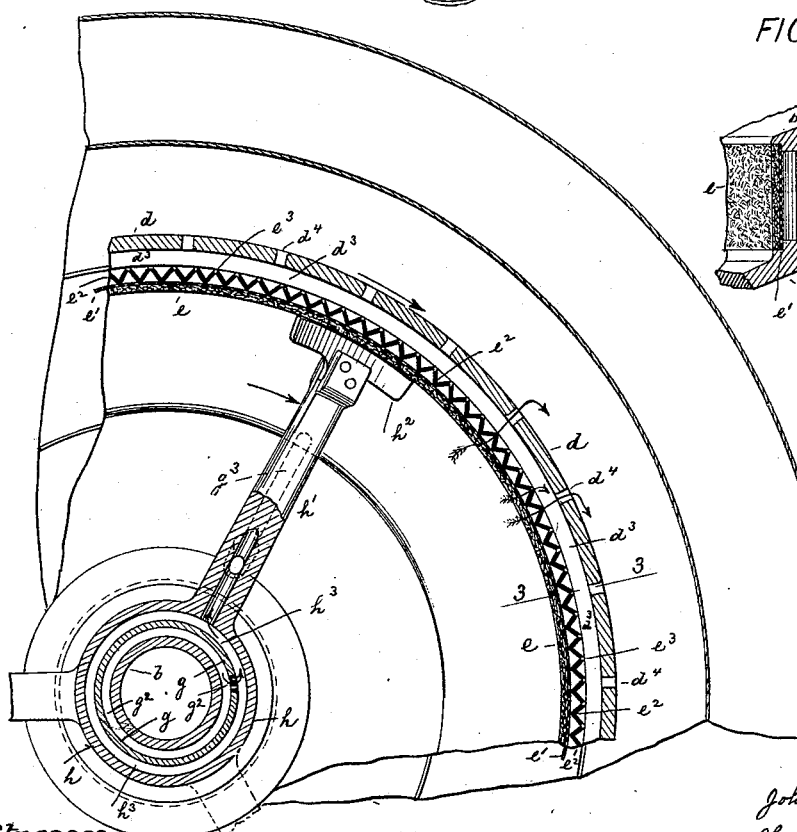
Figure 3:
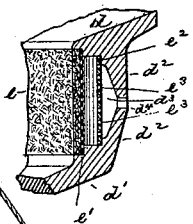

In the accompanying drawings, Figure 1 is an elevation, partly in section, of a centrifugal filter embodying our invention. Fig. 2 is a horizontal section of part thereof on line 2 2, Fig. 1, and drawn on an enlarged scale. Fig. 3 is a vertical section through the filtering body on line 3 3, Fig. 2; Fig. 4, an elevation of the differential gear, and Fig. 5 is a perspective view of the scraper.

The letter $a$ represents the stationary base of the filter, in which is stepped a revoluble spindle $b'$, that carries a collar or bottom $b^2$, provided with lateral discharge-orifices $b^3$ and a deflector $b^4$ above the same. To the collar $b^2$ there is attached a central hollow shaft $b$, communicating with a hopper $b^5$ and driven by a suitable pulley $c$. The filtering vessel $d$ is attached to the collar $b^2$, and is thus revolved by the pulley $c$. This vessel is provided with interior steps, each step consisting of an inclined annular base $d'$ and of an upright or substantially upright perforated section $d^2$. The steps are so formed that each step is smaller in diameter than the step next above, and in this way the entire vessel $d$, considered as a whole, widens from the bottom upward.

We have shown the vessel $d$ to be provided with three steps, but the number of these steps may be increased or diminished, and in some cases a single step may be found sufficient.

The filtering body or ring $e$ is preferably composed of a sheet of asbestos cloth, but other percolating or filtering substances may of course be substituted. The cloth $e$ is placed between retaining-flanges in front of the upright sections $d^2$, and is backed by a screen or perforated sheet of metal $e'$. Back of the screen $e'$ there is placed a corrugated strip of metal $e^2$, the inner edges of which serve as supports for the filtering body, while the outer edges are perforated, as at $e^3$, for the escape of the filtrate. This filtrate passes from the perforations $e^3$ into an annular chamber $d^3$, formed by inclining the inner faces of the upright sections $d^2$, and thence escapes through the perforations $d^4$ of the vessel $d$. Above each row of perforations $d^4$ the vessel $d$ is surrounded by a stationary deflector $f$, that conducts the filtrate into one of a series of chambers $f'$, having an inclined bottom $f^2$, and discharging it into one of a number of receiving vessels $f^3$. In this way the filtrate obtained from each of the steps of the vessel $d$ is separately collected. The filtering-rings are arranged in steps to correspond to the steps of vessel $d$, each ring being smaller in diameter than the ring next above.

The hollow shaft $b$ is surrounded by a second hollow shaft $g$, provided at its lower end with a flange $g'$ and free to revolve independently of shaft $b$ upon the upper edge of the collar $b^2$. To the shaft $g$ there is keyed within each of the steps of the vessel $d$ a hub $h$, provided with three (more or less) radial arms $h'$. The arms of each hub are placed slightly above one another, Fig. 5, so that in this way such arms traverse vertically the space inclosed by one of the steps of the vessel $d$. To the outer forked ends of the arms $h'$ are attached the inclined scrapers $h^2$, which revolve in close proximity to the filtering-cloth $e$. The shaft $g$ is of such a diameter with relation to the shaft $b$ that a waterway or conduit $g^2$ is formed between the shafts. This conduit is provided with the inlet or feed pipe $g^4$ and communicates at its lower end with the interior of vessel $d$ by means of the discharge-tubes $g^3$. These tubes are preferably connected to some of the radial arms $h'$, which are made hollow, and in turn communicate with the conduit $g^2$ by a groove $h^3$ of the hub and a perforation in the hollow shaft $g$, Fig. 2.

The shaft $g$ has, preferably, its separate power-pulley $g^4$, and should be driven at a slightly quicker or slower motion than the shaft $b$ and the vessel $d$. The object of this differential motion is to cause the scrapers to slowly traverse the vessel $d$ horizontally, and to thus gradually raise the ore or other solid matter from step to step. In this way not only clogging of the filtering body is prevented, but the solid matter is made to pass successively through the various steps of the vessel, so as to be presented successively to the filtering material of each step. To this part of our invention we attach considerable importance, as it permits a continuous and automatic operation of the machine and prevents clogging of the filtering body.

The shafts $b$ $g$ should be driven at a fixed ratio to each other, and in order to render such ratio permanent or unvarying we connect the same by a differential gearing, which is more fully shown in Fig. 4. This gearing consists of the wheels $h$ $h'$, keyed to the shafts $b$ $g$, respectively, and engaging a common idler $h^2$, hung in a fixed support $h^3$. The wheels $h$ $h'$ are differently meshed, one having a slightly greater number of teeth than the other, and in this way one shaft will be caused to revolve slightly quicker than the other.

The operation of the machine when used for the extraction of dissolved metals from ores is as follows: Rotary motion being imparted to the machine, the ore and solution to be separated therefrom are fed through the hopper $b^5$ into the hollow shaft $b$. The mixture will by the centrifugal action be thrown out of the openings $b^3$ and be guided by the deflector $b^4$ against the inner wall of the vessel $d$. Here the mixture will rise to the first filtering periphery, where the first or strongest filtrate is separated and collected in one of the receptacles $f^3$. The residue or gangue is by the inclined scrapers $h^2$ slowly drawn along the filtering periphery to prevent clogging. At the same time the inclined scrapers will cause the residue to rise slowly, so as to pass from the first step of the vessel $d$ into the second step. Here the filtering operation is repeated, and a weaker filtrate is separated and collected in a second vessel $f^3$. From the second step the residue passes into the third or any additional number of steps, where still weaker filtrates are obtained. Thus by using the proper number of steps all or practically all the liquid is separated from the solid. The latter is finally discharged over the rim of vessel $d$ and guided toward a dump by a deflector $i$.

If the ore is to be washed during the filtering operation, water is admitted by means of the pipe $g^4$ and ejected through the pipes $g^3$ into the vessel $d$.

It will be seen that by our invention a rapid and thorough filtration by a continuous process is effected, and that the filtrates may be automatically separated according to their strength.

What we claim is—

1. A centrifugal filter composed of a rotating vessel having perforated steps, filtering bodies secured within the steps, a feed-pipe opening at the bottom of the vessel, a surrounding hollow shaft, radial arms secured to the shaft, and scrapers secured to the arms, substantially as specified.

2. A centrifugal filter composed of a rotating vessel having perforated steps, filtering bodies secured within the steps, a central feed-pipe opening at the bottom of the vessel, a hollow shaft surrounding the feed-pipe and forming a water-conduit around the same, radial arms connected to the hollow shaft, discharge-tubes communicating with the water-conduit, and inclined scrapers secured to the radial arms, substantially as specified.

3. A centrifugal filter composed of a rotating vessel having perforated steps, filtering bodies secured within the steps, a central feed-pipe opening at the bottom of the vessel, a surrounding hollow shaft, radial arms secured to the shaft, inclined scrapers carried thereby, a series of collecting-chambers surrounding the vessel and communicating respectively with the perforated steps, and a series of receiving vessels communicating with the collecting-chambers, substantially as specified.

J. B. WARING.
HENRY R. CASSEL.

Witnesses:
F. v. BRIESEN,
FREDERICK SEIBEL.